US011193220B2

United States Patent
Wesson et al.

(10) Patent No.: US 11,193,220 B2
(45) Date of Patent: Dec. 7, 2021

(54) ELEVATOR SUSPENSION AND/OR DRIVING ASSEMBLY HAVING AT LEAST ONE TRACTION SURFACE COMPRISING EXPOSED WEAVE FIBERS

(71) Applicant: OTIS ELEVATOR COMPANY, Farmington, CT (US)

(72) Inventors: John P. Wesson, Vernon, CT (US); Gopal R. Krishnan, Wethersfield, CT (US); Timothy D. DeValve, Manchester, CT (US); Vijay Jayachandran, West Hartford, CT (US); Daniel Rush, Canton, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 731 days.

(21) Appl. No.: 15/822,419

(22) Filed: Nov. 27, 2017

(65) Prior Publication Data

US 2018/0087195 A1 Mar. 29, 2018

Related U.S. Application Data

(60) Division of application No. 13/822,080, filed as application No. PCT/US2011/021602 on Jan. 19, (Continued)

(51) Int. Cl.
*D03D 13/00* (2006.01)
*D03D 1/00* (2006.01)
(Continued)

(52) U.S. Cl.
CPC ............ *D03D 13/004* (2013.01); *B66B 7/062* (2013.01); *D03D 1/0094* (2013.01); *D03D 11/00* (2013.01);
(Continued)

(58) Field of Classification Search
CPC .............. D03D 13/004; D03D 13/006; D03D 13/0094; D03D 13/02; D03D 13/04; D03D 13/08; D03D 13/00
See application file for complete search history.

(56) References Cited

U.S. PATENT DOCUMENTS

| 1,475,250 A | 11/1923 | Sundh |
| 1,477,886 A | 12/1923 | Lewis |

(Continued)

FOREIGN PATENT DOCUMENTS

| CN | 1664202 A | 9/2005 |
| CN | 101324033 A | 12/2008 |

(Continued)

OTHER PUBLICATIONS

Extended European Search Report for Application No. EP11827106, dated Jan. 8, 2018.
(Continued)

*Primary Examiner* — Clinton T Ostrup
*Assistant Examiner* — Andrew Wayne Sutton
(74) *Attorney, Agent, or Firm* — Carlson, Gaskey & Olds

(57) ABSTRACT

An exemplary elongated elevator load bearing member includes a plurality of tension elements that extend along a length of the load bearing member. A plurality of weave fibers transverse to the tension elements are woven with the tension elements such that the weave fibers maintain a desired spacing and alignment of the tension elements relative to each other. The weave fibers at least partially cover the tension elements. The weave fibers are exposed and establish an exterior, traction surface of the load bearing member.

11 Claims, 2 Drawing Sheets

Related U.S. Application Data 2011, now abandoned, which is a continuation-in-part of application No. PCT/US2010/049433, filed on Sep. 20, 2010.

(51) Int. Cl.
| | | |
|---|---|---|
| *D03J 1/06* | (2006.01) | |
| *D07B 5/04* | (2006.01) | |
| *D06N 3/00* | (2006.01) | |
| *D03D 15/43* | (2021.01) | |
| *D03D 15/56* | (2021.01) | |
| *D03D 15/567* | (2021.01) | |
| *D03D 15/593* | (2021.01) | |
| *B66B 7/06* | (2006.01) | |
| *D07B 5/00* | (2006.01) | |
| *D06M 15/564* | (2006.01) | |
| *D03D 11/00* | (2006.01) | |
| *D03D 41/00* | (2006.01) | |
| *B29C 61/02* | (2006.01) | |
| *D07B 1/22* | (2006.01) | |

(52) U.S. Cl.
CPC .......... *D03D 13/006* (2013.01); *D03D 15/43* (2021.01); *D03D 15/56* (2021.01); *D03D 15/567* (2021.01); *D03D 15/593* (2021.01); *D03D 41/00* (2013.01); *D03J 1/06* (2013.01); *D06M 15/564* (2013.01); *D06N 3/0006* (2013.01); *D07B 5/005* (2013.01); *D07B 5/006* (2015.07); *D07B 5/04* (2013.01); *B29C 61/02* (2013.01); *D07B 1/22* (2013.01); *D07B 2201/1092* (2013.01); *D07B 2205/2003* (2013.01); *D07B 2205/2064* (2013.01); *D07B 2501/2007* (2013.01); *D10B 2101/20* (2013.01); *D10B 2401/04* (2013.01); *D10B 2401/063* (2013.01); *D10B 2403/02411* (2013.01); *D10B 2403/02412* (2013.01); *Y10T 428/24355* (2015.01); *Y10T 442/30* (2015.04); *Y10T 442/3008* (2015.04); *Y10T 442/3382* (2015.04)

(56) References Cited

U.S. PATENT DOCUMENTS

| | | | |
|---|---|---|---|
| 2,088,448 A | | 7/1937 | Specht |
| 2,270,154 A | | 1/1942 | Whittier |
| 2,332,393 A | | 10/1943 | Neville |
| 3,148,710 A | * | 9/1964 | Rieger .............. D03D 1/0094 139/415 |
| 3,885,603 A | * | 5/1975 | Slaughter .............. D21F 1/0036 139/383 A |
| 4,305,433 A | | 12/1981 | Vanassche et al. |
| 4,820,571 A | | 4/1989 | Searfass |
| 4,870,998 A | | 10/1989 | Westhead |
| 4,887,656 A | | 12/1989 | Verbauwhede et al. |
| 5,454,403 A | | 10/1995 | Kerr et al. |
| 5,566,786 A | | 10/1996 | De Angelis et al. |
| 5,752,550 A | * | 5/1998 | Scari' ............... D03D 15/0011 139/419 |
| 6,295,799 B1 | | 10/2001 | Baranda |
| 6,983,826 B2 | | 1/2006 | Wake et al. |
| 7,287,553 B2 | | 10/2007 | Wahhoud |
| 7,341,076 B2 | | 3/2008 | Braekevelt et al. |
| 7,661,514 B2 | | 2/2010 | Ach |
| 2002/0104715 A1 | | 8/2002 | Zaharia et al. |
| 2007/0235595 A1 | * | 10/2007 | Braekevelt .............. B21F 27/02 245/1 |
| 2008/0067007 A1 | | 3/2008 | Ach |
| 2008/0067009 A1 | | 3/2008 | Ach |
| 2010/0140022 A1 | * | 6/2010 | Ach ...................... B66B 7/062 187/251 |
| 2013/0042939 A1 | * | 2/2013 | Wesson ................ D03D 1/0094 139/11 |
| 2013/0277879 A1 | | 10/2013 | Pitts et al. |

FOREIGN PATENT DOCUMENTS

| | | |
|---|---|---|
| CN | 21546108 U | 8/2010 |
| EP | 0228725 A1 | 7/1987 |
| EP | 2154097 A1 | 2/2010 |
| GB | 848005 | 9/1960 |
| GB | 1559380 | 1/1980 |
| JP | 52-46255 | 10/1977 |
| JP | 1-94390 | 6/1989 |
| JP | 5178434 A | 7/1993 |
| JP | 47-08675 | 6/2011 |
| WO | 2005007988 A2 | 1/2005 |
| WO | 2005/094255 A2 | 10/2005 |

OTHER PUBLICATIONS

International Search Report and Written Opinion of the International Searching Authority for International application No. PCT/US2011/021602 dated Aug. 26, 2011.

First Search by the State Intellectual Property Office of People's Republic of China for Application No. 201180045010.1 dated Jun. 23, 2014.

International Preliminary Report on Patentability for International application No. PCT/US2011/021602 dated Apr. 4, 2013.

* cited by examiner

ELEVATOR SUSPENSION AND/OR DRIVING ASSEMBLY HAVING AT LEAST ONE TRACTION SURFACE COMPRISING EXPOSED WEAVE FIBERS

CROSS-REFERENCE TO RELATED APPLICATIONS

This application is a divisional of U.S. patent application Ser. No. 13/822,080, filed on Mar. 11, 2013, which is the national stage application of PCT/US2011/021602, filed on Jan. 19, 2011, which is a CIP of PCT/US2010/049433, filed on Sep. 20, 2010.

BACKGROUND

There are a variety of uses of elongated load carrying members such as round ropes or flat belts. One such use is to suspend the loads in elevator systems. The load carrying members are used for driving or propulsion in elevator systems. Round steel ropes have been the industry standard for many years. More recently flat belts including a plurality of tension member cords substantially retained in a jacket have been used in elevator systems. While there are advantages associated with such belts in an elevator system, there are also challenges presented.

For example, one challenge presented by some elevator belts is achieving a desired amount of traction between the belt and a traction sheave that causes movement of the belt and thus the elevator car. Different approaches have been suggested to achieve particular traction characteristics on a surface of an elevator belt. One approach is shown in the Published International Application WO 2005/094255. In that document, a jacket includes a roughened surface to provide desired friction characteristics.

Other challenges are associated with the techniques used to apply the jacket to the belt. Some such techniques result in features that are believed to be a cause of noise during elevator operation. Adding a jacket layer also adds cost and manufacturing complexities.

SUMMARY

An exemplary elongated elevator load bearing member includes a plurality of tension elements that extend along a length of the load bearing member. A plurality of weave fibers transverse to the tension elements are woven with the tension elements such that the weave fibers maintain a desired spacing and alignment of the tension elements relative to each other. The weave fibers at least partially cover the tension elements. The weave fibers are exposed and establish an exterior, traction surface of the load bearing member.

An exemplary method of making an elongated load bearing member includes providing a plurality of tension elements that extend along a length of the load bearing member. A plurality of weave fibers are woven together with the tension elements to thereby maintain a desired spacing and alignment of the tension elements relative to each other. The weave fibers at least partially cover the tension elements. The weave fibers are exposed and establish an exterior, traction surface of the load bearing member.

The various features and advantages of the disclosed examples will become apparent to those skilled in the art from the following detailed description. The drawings that accompany the detailed description can be briefly described as follows.

DETAILED DESCRIPTION

Figure 1:
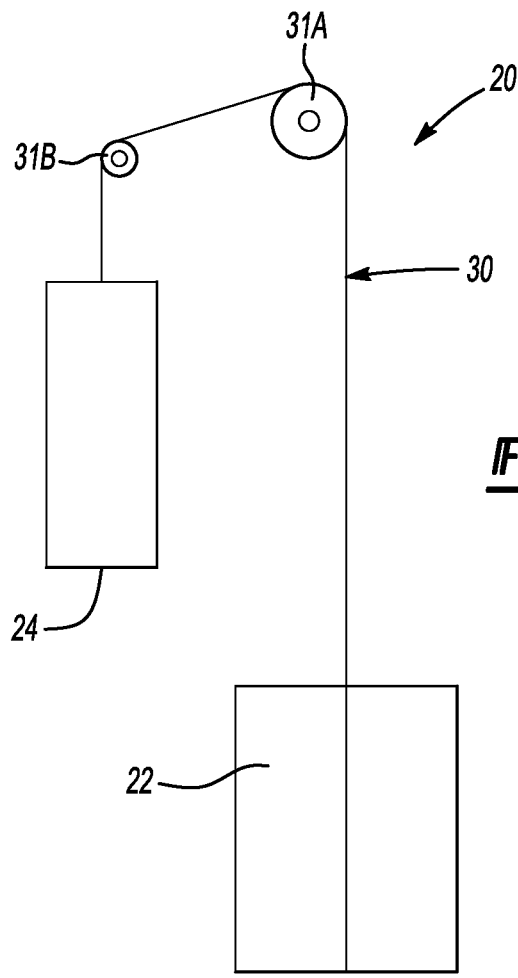
FIG. 1 schematically shows selected portions of an example elevator system.

FIG. 1 schematically shows selected portions of an example traction elevator system 20. The illustrated example is for discussion purposes only. Features of the elevator system 20 that are not required for an understanding of the present invention (e.g. guide rails, safeties, etc.) are not shown or discussed. Those skilled in the art will appreciate that the present invention could be used in a variety of elevator system configurations and not only the specific example shown in this Figure. This example includes an elevator car 22 coupled with a counterweight 24 by one or more elongated elevator load bearing members 30 in a 1:1 roping arrangement. Other roping arrangements, such as 2:1 or greater, are possible. The weight of the elevator car 22 and counterweight 24 is suspended by the elongated elevator load bearing members 30.

A traction sheave 31A causes desired movement of the elongated elevator load bearing members 30 to achieve desired movement and placement of the elevator car 22 within the hoistway. The illustrated example elevator system 20 includes a deflector pulley 31B as seen in FIG. 1 that also engages the elongated elevator load bearing members 30. Other examples include one or more idler or diverter pulleys on the car 22, the counterweight 24 or both (for example to provide an overslung or underslung roping arrangement) that also engage the elongated elevator load bearing members 30.

Figure 2:
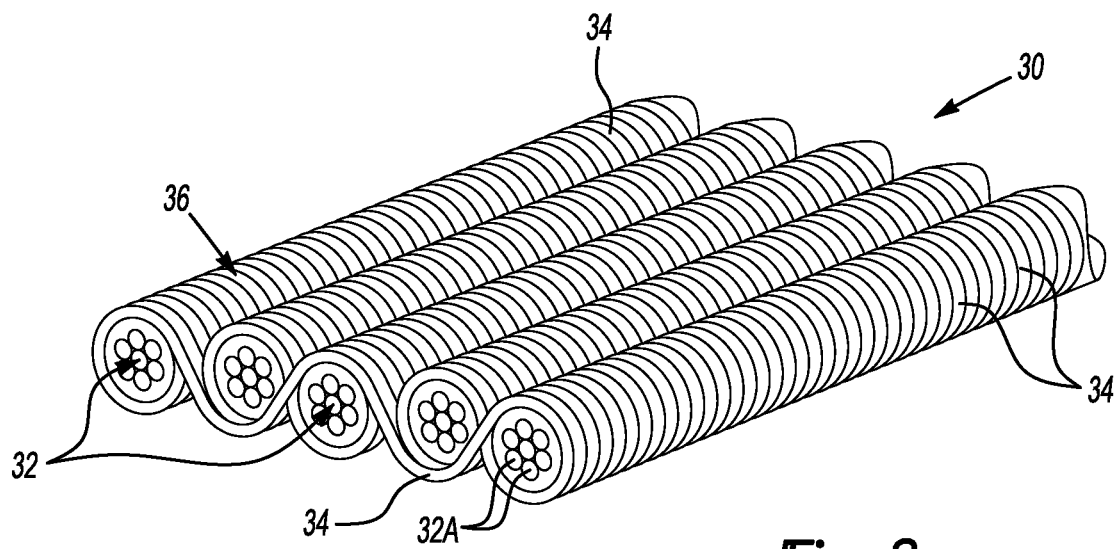
FIG. 2 diagrammatically illustrates an example load bearing member having weave fibers that are woven together with tension elements.

FIG. 2 illustrates an example elongated elevator load bearing member 30. This example includes a plurality of tension elements 32. As can be appreciated from the drawing, the tension elements 32 are arranged generally parallel to each other and extend in a longitudinal direction that establishes a length dimension of the elongated elevator load bearing member 30. A plurality of weave fibers 34 are woven together with the tension elements 32. In this example, the weave fibers 34 and the tension elements 32 are woven together into a fabric that maintains the tension elements 32 in a desired orientation relative to each other. In other words, the weave fibers 34 substantially retain the tension elements 32 in position. The phrase "substantially retained" means that the weave fibers 34 sufficiently engage the tension elements 32 such that the tension elements 32 do not pull out of the weave and remain substantially stationary relative to the weave fibers 34 in use (e.g., when the elongated elevator load bearing member 30 is subject to a load encountered during use in an elevator system 20 with, potentially, an additional factor of safety). The weave fibers 34 in this example have a length that is transverse to the length or longitudinal direction of the tension elements 32.

The example load bearing member 30 includes an exterior, traction surface 36 on at least one side of the load bearing member 30. The traction surface 36 is established by exposed weave fibers 34. An "exposed" weave fiber 34 in most embodiments will not be exposed along its entire length. The weave fibers 34 are woven into the woven fabric of the load bearing member 30 so that portions of each fiber will be beneath other weave fibers 34 or the tension elements 32.

In the illustrated example, all of the weave fibers 34 are exposed on the exterior, traction surface 36. In some examples, the layers of the weave or the arrangement of the weave fibers 34 leaves at least some of the weave fibers 34 covered over by other weave fibers 34. In such examples, only some of the weave fibers are exposed and establish the exterior, traction surface.

The tension elements 32 are the primary load bearing structure of the elevator load bearing member 30. In some examples, the weave fibers 34 do not support the weight of the elevator car 22 or counterweight 24. Nevertheless, the weave fibers 34 do form part of the load path. The weave fibers 34 directly transmit the traction forces between the traction sheave 31 and the elevator load bearing member 30 to the tension elements 32 because the weave fibers 34 are exposed at the traction surface 36.

The weave fibers 34 in some examples prevent the tension elements 32 from contacting any component that the traction surface 36 engages. For example, the tension elements 32 will not contact a surface on the traction sheave 31 as the load bearing member 30 wraps at least partially about the traction sheave 31. The size of the weave fibers 34, the material of the weave fibers 34, the pattern of the weave fibers 34 or a combination of these is selected to ensure the desired spacing between the tension elements 32 and the traction surface 36 so that the tension elements 32 are protected from direct engagement with a component such as the traction sheave 31. The weave fibers 34 in some examples cover more than 50% of the surface area of the tension elements 32 that faces in the same direction as the traction surface 36.

In one example the tension elements 32 comprise a first material and the weave fibers 34 comprise a second, different material. In the illustrated example, the weave fibers 34 have a much smaller thickness or cross-sectional dimension compared to that of the tension elements 32. In one example the tension elements 32 are metallic, such as drawn steel, and the weave fibers 34 comprise non-metallic materials, such as polymers for example. The illustrated example tension elements 32 in FIG. 2 comprise metal cords each comprising wound wires.

As a result of the weaving process in this example, each tension element 32 remains in a generally planar orientation along its length while the weave fibers 34 are in various locations along the length of each weave fiber 34. The weave fibers 34 are of a lighter weight compared to the tension elements 32 and the weave fibers 34 are manipulated during the weaving process to conform about the exterior of the tension elements. Each of the weave fibers 34 may be partially wrapped over the top (according to the drawing) of one of the tension elements, beneath an adjacent tension element 32 and over the top of the next. In some examples, the tension elements 32 are held under tension during the weaving process, which keeps the tension elements 32 straight along the portion of their length with which the weave fibers 34 are being woven together.

In the illustrated example, all of the tension elements 32 are aligned with each other in a generally parallel and generally co-planar arrangement. The weave fibers 34 maintain that desired alignment while allowing the load bearing member 30 to bend around sheaves in an elevator system. The weave fibers 34 maintain the desired relative orientations of the tension members 32 without requiring any external coating or jacket over the load bearing member 30.

In some examples, the weave fibers 34 include or comprise an elastomer material that is useful for establishing the traction surface 36. One example includes establishing weave fibers 34 of a desired material and then coating or impregnating the fibers with the elastomer material. Another example includes making each of the weave fibers 34 out of a plurality of filaments and including filaments made of the selected elastomer material within each of the weave fibers 34. One example elastomer material comprises a urethane. Thermoplastic polyurethane is used in one example.

In some examples, the weave fibers 34 comprise yarn that is treated with a known sizing material. The sizing in some examples enhances the ability to weave the tension elements 32 and weave fibers together. The sizing in some examples enhances a wear characteristic of the weave fibers 34 such as minimizing fretting or fraying of the weave fibers during use in an elevator system. The sizing in some examples provides a desired traction characteristic on the traction surface 36.

A variety of different weave patterns can be used to weave together the weave fibers 34 and the tension elements 32. FIG. 2 shows one such example pattern of the weave fibers 34. In this example, the weave fibers 34 that are exposed on the exterior, traction surface 36 are aligned generally parallel to each other and generally perpendicular to the longitudinal direction of the tension elements 32.

Figure 3:
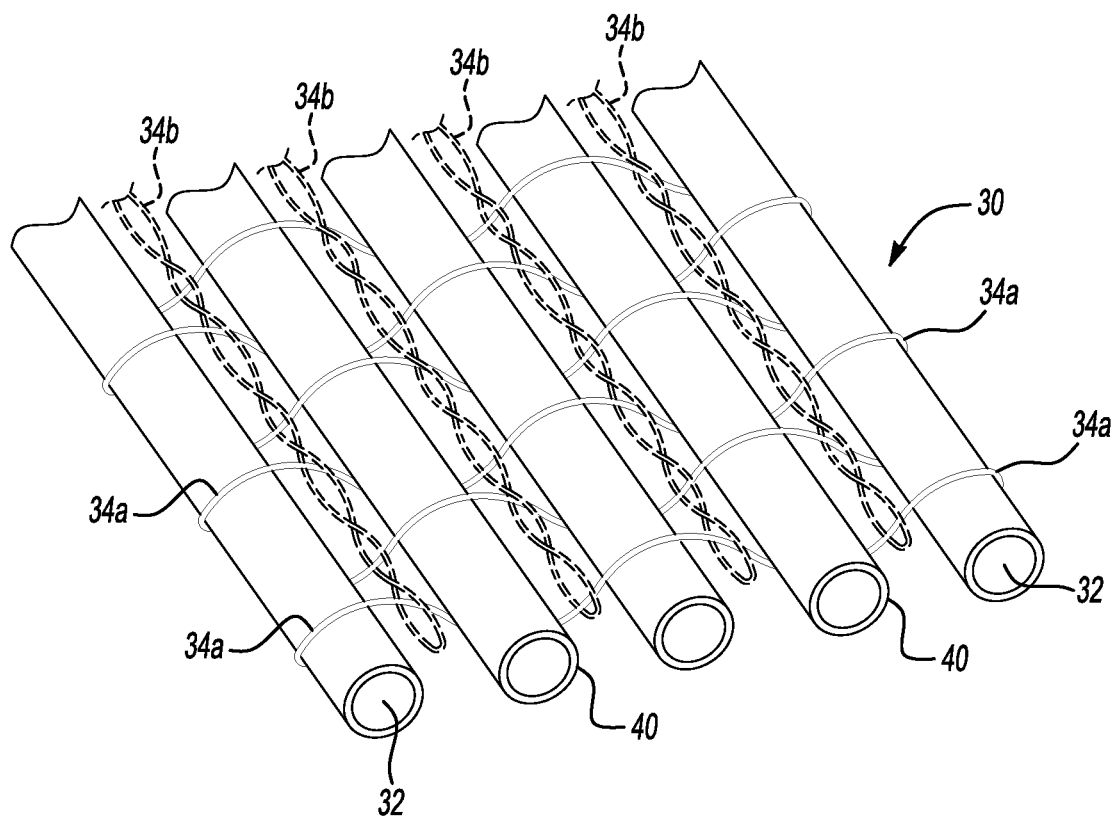
FIG. 3 schematically shows one example weave pattern that includes weave fibers in more than one direction.

FIG. 3 schematically illustrates another example weave pattern partially expanded to show the relative orientation of the weave fibers 34 relative to each other (the completed assembly would have weave fibers 34 and tension elements 32 much closer together similar to those shown in FIG. 2). In this example, some of the weave fibers 34a are arranged generally perpendicular to the longitudinal direction or length of the tension elements 32. Others of the weave fibers 34b are arranged generally parallel to the tension elements 32 and generally perpendicular to the weave fibers 34a. As can be appreciated by comparing FIG. 2 to FIG. 3, the example weave pattern of FIG. 3 will have a slightly different characteristic on the traction surface 36 when the weave fibers 34b are included in a position where they are exposed on the traction surface 36. In another example, the weave fibers 34b are maintained only in spaces between the tension elements 32 and are not exposed so they do not have an impact on the contour or texture of the traction surface 36.

One feature of the example of FIG. 3 is that each of the tension elements 32 includes a coating 40. In one example, the coating 40 is a protective coating to prevent corrosion of the material of the tension elements 32. In another example, the coating 40 comprises an adhesive that facilitates the suitable positioning of, or bonding between, the weave fibers 34 and the exterior surface of the tension elements 32. Still another example coating 40 comprises an elastomer that may be useful for protecting the material of the tension elements 32 during use in an elevator system. An elastomer coating 40 can also be useful for suitably positioning, or bonding, the weave fibers 34 in place with respect to the tension elements 32 if for example such a coating 40 is heated after the woven fabric is established.

In the example of FIG. 2, each tension element 32 comprises a plurality of wires formed into strands 32A that are then wound together into a single cord. In that example, each tension element 32 comprises a plurality of individual load bearing strands 32A or wires, for example. In the example shown in FIG. 4, the tension elements 32 are distributed throughout the weave. The tension elements 32 in this example may be of the same size and characteristic as the individual wires or strands within a wound cord such as those included in the example of FIG. 2. The tension elements 32 in an example like FIG. 4 may also be of a larger size.

Figure 4:
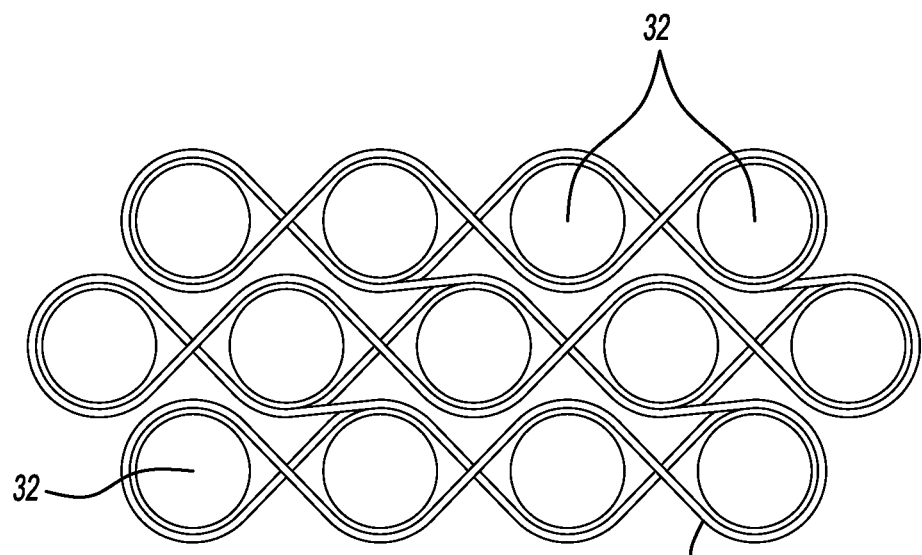
FIG. 4 schematically shows another example that includes tension elements distributed throughout a woven belt.

One example configuration like that shown in FIG. 4 includes discreet metal wires as the tension elements 32. In one such example, the metal wires have an outside diameter that is approximately equal to the outside diameter of the weave fibers 34. In another example, the weave fibers 34 have a smaller diameter compared to that of the tension elements 32.

The disclosed examples provide a woven fabric as a basis for an elevator load bearing member. They provide the ability to realize an elevator load bearing member having a plurality of tension elements without requiring an application of a secondary or jacket material. Eliminating the requirement for a secondary coating or jacket enhances the economies of some manufacturing processes and eliminates features of such jackets that have come to be recognized as sources of challenges or drawbacks when they are in use in an elevator system.

One feature of the disclosed examples is that using a weave to maintain the tension elements 32 in a desired position relative to each other instead of using a jacket provides more damping compared to the viscoelastic behavior present with urethane jackets. Providing more damping by using a weave instead of a jacket can reduce noise levels during elevator system operation.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of making an elongated elevator load bearing member of a traction elevator system, comprising the steps of:
   arranging a plurality of tension elements to establish a desired spacing and alignment of the tension elements relative to each other that the tension elements have when the load bearing member is in use in a traction elevator system; and
   subsequent to the arranging and with the established desired spacing and alignment of the tension elements, weaving a plurality of weave fibers together with the tension elements to thereby
   (i) maintain the desired spacing and alignment of the tension elements relative to each other,
   (ii) at least partially cover the tension elements, and
   (iii) establish an exterior, traction surface of the load bearing member comprising exposed ones of the weave fibers.

2. The method of claim 1, comprising
   at least partially covering the tension elements with the weave fibers that have a thickness sufficient to prevent the tension elements from contacting a component that the traction surface engages.

3. The method of claim 1, comprising
   at least partially covering the tension elements using a weave pattern that comprises a predetermined spacing between the weave fibers that establishes a surface area of coverage over the tension elements sufficient to prevent the tension elements from contacting a component that the traction surface engages.

4. The method of claim 1, wherein the tension elements comprise a first material and the weave fibers comprise a second, different material.

5. The method of claim 4, wherein the tension elements comprise metal and the weave fibers are non-metallic.

6. The method of claim 1, wherein the weave fibers comprise yarn and sizing.

7. The method of claim 1, wherein the weave fibers comprise yarn impregnated with an elastomer material.

8. The method of claim 1, wherein the tension elements are at least partially coated with an adhesive coating prior to the weaving.

9. The method of claim 1, wherein the tension elements are at least partially coated with an elastomer material prior to the weaving.

10. The method of claim 1, wherein the weave fibers have a first outside dimension and the tension members have a second, larger outside dimension.

11. A method of making an elongated elevator load bearing member of a traction elevator system, comprising the steps of:
   providing a plurality of tension elements; and
   weaving a plurality of weave fibers together with the tension elements to thereby
   (i) maintain a desired spacing and alignment of the tension elements relative to each other that the tension elements have when the load bearing member is in use in a traction elevator system,
   (ii) at least partially cover the tension elements, and
   (iii) establish an exterior, traction surface of the load bearing member comprising exposed ones of the weave fibers;
   wherein the weave fibers comprise yarn and sizing.

* * * * *